United States Patent [19]

Perin et al.

[11] Patent Number: 4,824,464

[45] Date of Patent: Apr. 25, 1989

[54] PROCESS AND APPARATUS FOR HEATING GLASS SHEETS

[75] Inventors: Francis Perin, Sauvigny les Bois; Herve Prouveur, Liev-Saint Amand, both of France

[73] Assignee: Saint-Gobain Vitrage, Courbevoie, France

[21] Appl. No.: 36,327

[22] Filed: Apr. 9, 1987

[30] Foreign Application Priority Data

Apr. 9, 1986 [FR] France .................................. 86 05057

[51] Int. Cl.$^4$ ........................................... C03B 29/04
[52] U.S. Cl. ...................................... 65/106; 65/111; 65/114; 65/118; 65/273; 65/350; 65/374.13
[58] Field of Search ................. 65/114, 350, 111, 118, 65/106, 273, DIG. 4, 374.13

[56] References Cited

U.S. PATENT DOCUMENTS

| | | | |
|---|---|---|---|
| 3,744,985 | 7/1973 | Peternel | 65/118 X |
| 3,942,967 | 3/1976 | Jack et al. | 65/118 X |
| 4,119,426 | 10/1978 | Kelly | 65/350 X |

FOREIGN PATENT DOCUMENTS

| | | | |
|---|---|---|---|
| 0614033 | 7/1978 | U.S.S.R. | 65/374.13 |
| 1133615 | 11/1968 | United Kingdom | 65/114 |

*Primary Examiner*—Arthur Kellogg
*Attorney, Agent, or Firm*—Oblon, Fisher, Spivak, McClelland & Maier

[57] ABSTRACT

A device and a process for heating glass sheets in horizontal position, to bend them or temper them, by means of two series of resistors, the series being distributed on both sides of the path followed by the glass sheet and on a portion of the length of this path. Each resistor group is distributed in longitudinal zones or in crosswise subzones of various widths along the longitudinal zones, the power furnished to each longitudinal zone being regulated independently of the power furnished to the other longitudinal zones and being distributed in a controlled way between the crosswise zones and the longitudinal zones.

22 Claims, 2 Drawing Sheets

PROCESS AND APPARATUS FOR HEATING GLASS SHEETS

BACKGROUND OF THE INVENTION

F1. Field of the Invention

The invention relates to a process and a device making it possible to control the heating of a heated glass sheet in a horizontal furnace for heat treatment and/or bending.

2. Background of the Prior Art

It is well known to use horizontal furnaces for the heating of glass sheets, called tunnels, passed through by sheets conveyed on a bed of rollers. In these furnaces, the glass sheet is gradually heated and exhibits at the output of the furnace a temperature, for example, greater than the softening point of the glass so that the sheet is then sufficiently plastic to be bent and/or tempered.

Such horizontal furnaces comprise a bottom and a crown of refractory products and the addition of heat is obtained by means of resistors, mounted symmetrically on both sides of the roller conveyor. These resistors are distributed in various longitudinal zones, whose number varies with the length of the furnance, the longitudinal zones themselves divided into crosswise zones of equal widths and lengths. By way of illustration, a horizontal furnace with a length of twelve meters and 1.20 meters wide can thus be divided into five longitudinal zones 2.40 meters in length, each of these zones itself being divided into 3 zones 0.40 meter wide. These dimensions are suitable, for example, for a furnace for heating automobile glazing pieces such as side windows.

Even if in the example cited by way of illustration, 15 resistor zones capable of furnishing 15 different powers of heat are available, it is found that a nonuniform heating of the glass sheets occurs. Consequently, it is very difficult to control this differentiated heating so as to heat, for example, more intensely the zones of the glass that must undergo the greatest deformation.

This nonuniformity of the heating of the glass, precisely, this inabilty to regulate it is explained by various reasons. In the first place, it is explained by the radiation of the refractories used for the construction of the bottom and of the crown of the furnace, refractories which re-emit the received heat to the point that, in certain installations, scarcely 45% of the heat received by the glass comes directly from the resistors, the prime source of heat. This radiation of the refractories is performed in all directions in space and results in a leveling of the heat emissions which works against the desired effect of the differentiation of the heating zones. In addition, certain zones of the glazing are systematically less heated than others; actually, between the resistor zones are zones which do not have resistors and which determine crosswise zones and longitudinal zones which do not coincide with the direct heating of the glass. Since the crosswise zones are all the same width, there is a continuous belt parallel to the direction of advance of the glass, which does not contribute directly to the heating of the glass. These shadow zones thus create a differentiated heating that cannot be controlled which is found in the sequence of operations with, for example, a zone of least tempering.

Finally, if by a very thorough regulation, the various phenomena—which, as we have indicated, have opposite effects—are balanced, the furnace all the same is unsatisfactory for certain types of glazings. Let us take the furnace previously given as an example and imaging processing square glazings that are 50 cm on a side. To be received correctly by the processing units downstream from the furnace, the glazing must necessarily be centered which means that systematically these edges will circulate in shadow zones and will not be able to be overheated. In short, to attenuate certain harmful effects due to the difficulty of maintaining the heating, the position of the glass sheet can be acted upon, but there are then created problems of receiving said glass sheets at the output of the furnace.

SUMMARY OF THE INVENTION

This invention proposes a horizontal furnace intended for the heating of glass sheets such that it makes possible a precise control of the heating of the glass sheet.

According to the invention, this controlling of the heating of the glass is obtained first of all thanks to a particular distribution of the resistors placed in the furnace. These resistors are distributed in a lower layer, under the path of the glass sheets and in an upper layer. The heating process according to the invention is such that, for each layer, the heating resistors are distributed in longitudinal zones and in crosswise subzones of various widths along the longitudinal zones, the temperature of each longitudinal zone and more specifically of each crosswise subzone being regulated independently of the temperature of the other zones.

This distribution of heating resistors makes possible a precise control of the amount of heat furnished to the glass sheet and optionally a quick modification of it.

Actually, because the crosswise subzones have dimensions that are different from one another, there no longer exist continuous shadow zones parallel to the direction of advance of the glass sheets. In addition, by modulation of the temperature of each crosswise subzone, there is obtained, with only a small number of crosswise subzones, for example three per longitudinal zone, a furnace of quality greater than furnaces having 5 or even 7 crosswise subzones of equal dimensions, with regard to the problem of the regulation of heat.

Further, with a furnace according to the invention, the heating parameters can be easily modified, in an asymmetric way. Thus, if at the time of the tempering or bending operation it is found that a single side of the glazing is not optimally heated, it is possible to remedy it by most often modifying only the temperature of a single crosswise subzone.

The invention also related to a furnace for heating glass in horizontal position for using the process according to the invention. The furnace, through which a conveyor of the bed of rollers type passes, comprises a crown and a bottom supporting respectively an upper layer and a lower layer of resistors, distributed in longitudinal zones and in crosswise subzones, each of various widths and each equipped with means for regulating their temperature.

The bottom and the crown are in a particularly preferred embodiment insulated by fibrous refractories of slight density which make it possible to control the heating of each zone, and even of each subzone, in a very precise way. A furnace consisting of fibrous refractories of slight density actually has a slight thermal inertia which makes it possible to modify very rapidly the conditions for heating the glass.

Also preferably, the transport of the glass sheets through the horizontal heating furnace is performed on hollow tubular elements of silica glass, covered with sheaths of woven silica yarns. These elements advantageously contribute to a better control of the heating of the glass sheets.

BRIEF DESCRIPTION OF THE DRAWING

Other characteristics and advantages of the invention come out in the following description made with reference to the accompanying sheets of drawings in which.

DETAILED DESCRIPTION OF THE INVENTION

The invention applies to furnaces for reheating glass sheets, of the tunnel furnace 1 type, in which the glass sheets are loaded in horizontal position and are transported through the furnace by a horizontal conveyor 5 consisting generally of a bed of rollers.

These furnaces are especially used for heating of glass sheets, initially at ambient temperature, to their softening temperature to bend them and/or to temper them. These heat treatments are generally the main causes of ultimate defects and in particular optical defects. To minimize them, it is particularly essential to control the temperature of the glass at the output of the furnace so as to have a very precise temperature profile of the glass sheet.

In many cases, if a uniform tempering treatment, for example, is desired, it is necessary to have a perfectly uniform temperature of the surface of the glass. In other cases, if a zone of the glazing must undergo a particularly significant deformation, such as a folding, or if it must exhibit a tempering level different from that of the rest of the glazing, it is necessary on the other hand to have zones heated differently, so as indeed to localize the deformations.

This precision of the temperature profile of the glass sheet is obtained according to the invention by the combination of the characteristics developed below.

Figure 2:
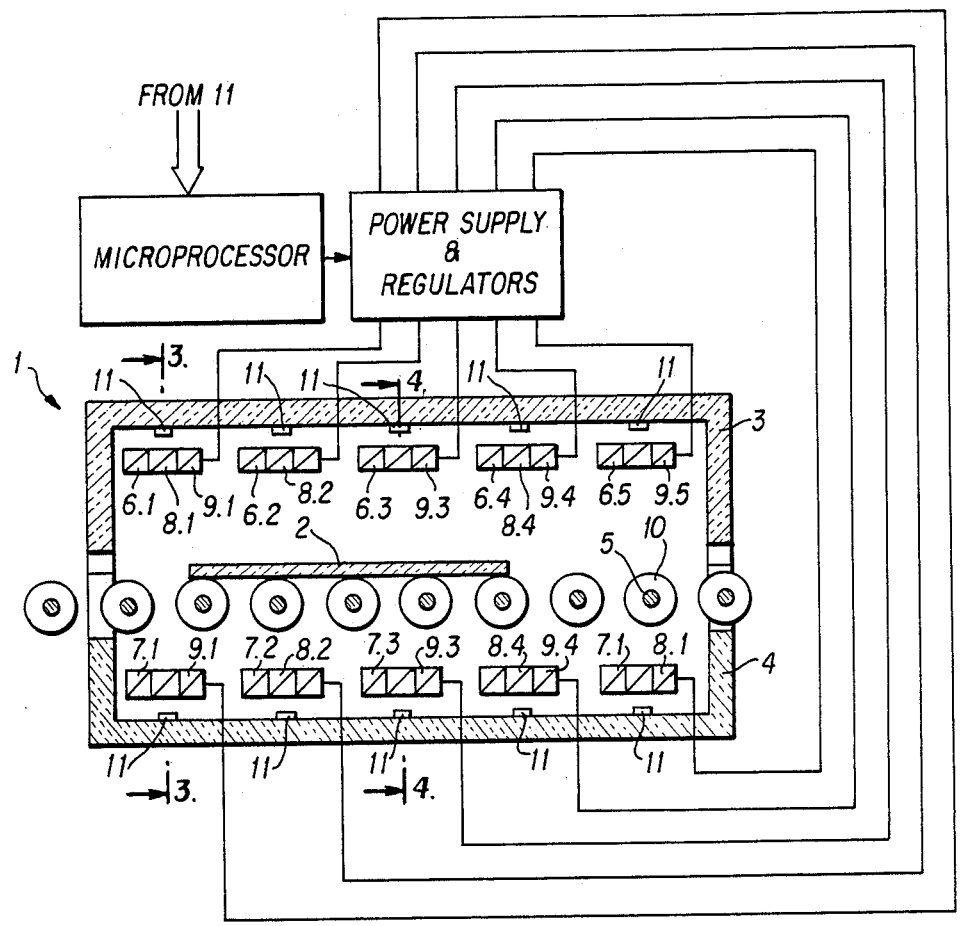
FIG. 2 represents a diagrammatic longitudinal cross-sectional view of the device for heating glass sheets in accordance with the present invention.
Figure 3:
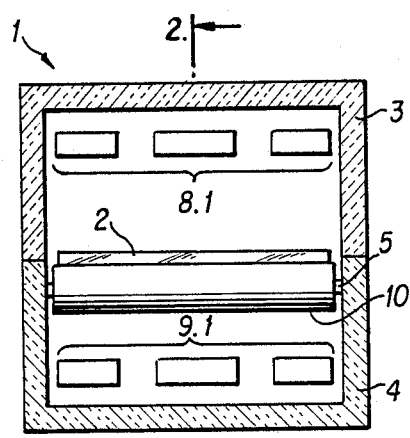
FIG. 3 represents a diagrammatic cross-sectional view of the device for heating glass sheets in accordance with the present invention taken along line 3—3 of FIG. 2.
Figure 4:
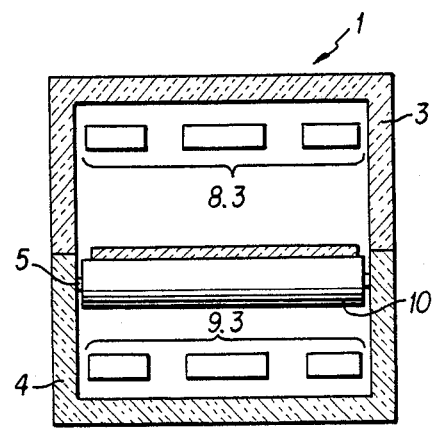
FIG. 4 represents a diagrammatic cross-sectional view of the device for heating glass sheets in accordance with the present invention taken along line 4—4 of FIG. 2.

In accordance with the present invention a device for heating glass sheets in a horizontal position, comprises a furnace 1, as shown in FIGS. 2-4 for example, which comprises an upper layer 6.1-6.5 and a lower layer 7.1-7.5 of resistors placed respectively above and below a conveyor 5 for glass sheets 2 going through the furnace. The resistors of each layer are distributed in longitudinal zones equipped with means for regulating their temperature. Each longitudinal zone comprises crosswise subzones of varying widths as a function of the position in the furnace of the longitudinal zone to which they belong and are equipped with means for regulating the temperature of the subzone. The device has means for regulating the temperature of the crosswise subzones comprising means for regulating the total power furnished to each longitudinal zone. The furnace 1 comprises a metal framework, a bottom 4 and a crown 3 insulated by fibrous refractories. The resistors 6.1-6.5 and 7.1-7.5 are wound around refractory aluminum silicate tubes 8.1-8.5 and 9.1-9.5. The conveyor 5 for glass sheets comprises a bed of rollers made of hollow tubular elements. The hollow tubular elements are comprised of silica glass. The conveyor is comprised of elements sheathed with a fabric of silica yarn 10.

Figure 1:
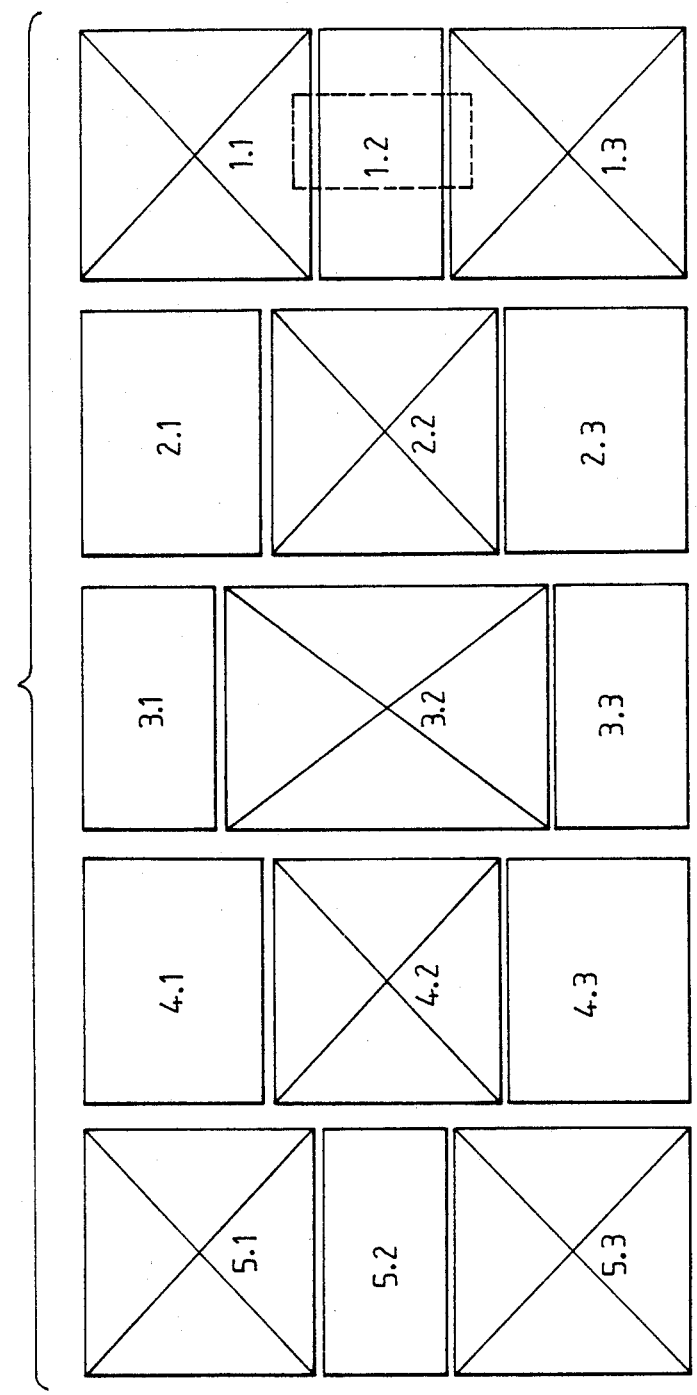
FIG. 1 represents a typical diagram for distribution of the heating resistors in a furnace according to the invention. The characteristics of this furnace are give only by way of illustration and should not be understood as limiting the invention.

With such a furnace, a relatively fine regulation of the heating zones is made possible. For this purpose, the furnace is divided, for example, into 5 longitudinal zones 1.1-1.3, 2.1-2.3, 3.1-3.3, 4.1-4.3, and 5.1-5.3 equal lengths and fed independently of one another as shown in FIG. 1 for example. With a furnace 12 meters long in which the glass passes zone 1.1-1.3 toward zone 5.1-5.3, there can successively be a zone 1.1-1.3 with a heating power of 130 kilowatts, zones 2.1-2.3 of 115 kilowatts, zones 4.1-4.3 and 5.1-5.3 of 70 kilowatts.

Each of these longitudinal zones is divided into three crosswise subzones of variable widths, going for example from 200 mm for the central zones 1.2 and 5.2 to 540 mm for zone 3.2. To regulate the temperature of each of these subzones, the power furnished to each longitudinal zone is distributed in the crosswise subzones and regulated by a PID type regulator, as shown in FIG. 2 for example, which distributes the power in each corresponding subzone by means of a potentiometer for percentage distribution of power.

To control this regulation, preferably a microprocessor, shown in FIG. 2 for example is used that loops starting from temperatures picked up by thermocouples 11 placed on the bottom and on the crown of the furnace, in the center of each longitudinal zone.

With a distribution of resistors as shown in FIG. 1, i.e., placed so that the discontinuous lines which separate the various crosswise subzones constitute approximately diamonds and by providing supply powers relatively stronger in the crosswise zones marked with a cross on their diagonal than in the zones left blank in the figure, a very good control of the heating of the glass is obtained. If the dimensions of the glazings correspond to those of the glazing diagrammed in dotted lines, i.e., for example, on the order of 0.4 meter long, it will be preferably to choose to keep the resistor zones 1.1, 1.3, 5.1 and 5.3 at a relatively low temperature, the heating obtained with the central resistor zones (1.2, 2.2, 3.2, 4.2 and 5.2) being sufficient. Since the operation of the furnace according to the invention is therefore particularly economical and all the temperature combinations of the various resistor zones are possible, portions of the glazing are kept from being heated insufficiently—or on the other hand—too strongly.

Such a furnace is particularly useful if pieces of various sizes must successively be treated by the same installation. Other distributions of the resistor zones can also be used, particularly if the furnace is loaded with several pieces advancing abreast.

The successive modifications of the heating parameters are, in addition, short if, in a preferred way, the furnace is not built with refractory bricks of great density, but exhibits a metal structure with inner walls insulated by fibrous refractories. Such a furnace has a very small thermal inertia, and therefore its heating, as well as its cooling, is very rapid. Thus a tunnel furnace for example 12 meters long and 1.20 meters wide intended to heat glass sheets to a temperature in the vicinity of 600°-700° C. is cooled in less than two hours which makes possible rapid interventions for repairs and is returned to temperature in about an hour and a half, while with dense refractory materials such operations necessariy involve the interruption of production for at least a day.

The heating is, for example, assured by resistors wound around refractory tubes preferably of aluminum silicate. Such a mounting exhibits the advantage of being lightweight and therefore easily supportable by the metal framework of the furnace. In addition, the defective elements can thus be replaced very rapidly and easily without waiting for the cooling of the furnace, because of the good resistance to thermal shocks of such refractory tubes.

The transport of the glass sheets through the tunnel furnace is performed by a roller conveyor, consisting of a row of tubes placed parallel to each other and perpendicular to the direction of advance of the glass at the ends of which pinions are glued, themselves driven by chains. These tubes are preferably hollow tubes of silica glass, which minimizes the thermal exchanges between the glass and the bed of rollers, and contributes again to an improvement of the thermal control in comparison with furnaces having solid rollers.

Preferably, the tubes of the conveyor are sheathed by a fabric of silica yarn which on the one hand damps the shocks and makes contact between the glass and the roller softer, and on the other hand adsorbs impurities such as possible dust in the furnace. In addition, this refractory fabric itself minimizes the glass-roller heat exchange.

In a more particularly preferred way, the glass sheets are loaded crosswise, as the single sheet of drawings indicates, i.e., they are placed with their greatest length perpendicular to the direction of advance. Such an arrangement exhibits the dual advantage of minimizing optical defects, i.e., those that are found in the field of vision of the driver when these glazings are mounted in an automobile and, in addition, at an equal rate, the furnace can have a length less than the one necessary in the case of a longitudinal loading of the glass sheets.

Thus, a furnace according to the invention is a compact furnace, very easy to maintain and in which all the elements contribute to a good control of the temperature for heating the glass.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for heating glass sheets to subsequently bend and/or temper them, comprising:
   advancing said glass sheets along a path between two layers of resistors, the layers being distributed on both sides of the path followed by the glass sheet and on a portion of the length of this path, each layer of resistors being divided into independently controlled longitudinal zones, and each longitudinal zone comprising crosswise subzones with the subzones in adjacent zones being of various widths;
   arranging said crosswise subzones so that the borders between subzones are longitudinally out of line with the corresponding borders in adjacent zones so as to eliminate a non-temperature-controlled belt, not contributing to the heating of the glass sheets parallel to the direction of advance of the glass sheets; and
   regulating the temperature of each crosswise subzone independently of the temperature of the other crosswise subzones thereby controlling differentiated heating.

2. Process of claim 1, wherein said crosswise subzones are placed so that the lines of separation between the crosswise subzones define an approximate diamond shape.

3. Process of claim 1, wherein said glass sheets are introduced into said path such that their longest dimension lies perpendicular to the direction of advance.

4. A process for heating glass sheets subsequently bend and/or temper them, comprising:
   advancing said glass sheets along a path between two layers of resistors, the layers being distributed on both sides of the path followed by the glass sheet and on a portion of the length of this path, each layer of resistors being divided into independently controlled longitudinal zones, and each longitudinal zone comprising crosswise subzones with the subzones in adjacent zones being of various widths;
   arranging said crosswise subzones so that the border between subzones are longitudinally out of line with the corresponding borders in adjacent zones so as to eliminate a non-temperature-controlled belt, not contributing to the heating of the glass sheets parallel to the direction of advance of the glass sheets;
   said glass sheets substantially heated by heat received directly from said resistors;
   said path being within a furnace with insulations of a refractory material, and said glass sheets receiving little heat re-emitted from said refractory material; and
   regulating the temperature of each crosswise subzone independently of the temperature of the other crosswise subzones thereby controlling differentiated heating.

5. Process of claim 4, wherein the pattern of crosswise subzones eliminates a non-temperature-controlled belt, not contributing to the heating of the glass sheets and located between crosswise subzones, parallel to the direction of advance of the glass sheets.

6. Process of claim 4, wherein said crosswise subzones are placed so that the lines of separation between the crosswise subzones define an approximate diamond shape.

7. Device for heating glass sheets comprising:
   a furnace which comprises an upper layer and a lower layer of resistors placed respectively above and below a conveyor for glass sheets going through the furnace, said resistors of each layer being distributed in longitudinal zones equipped with means for regulating their temperature;
   each longitudinal zone comprising crosswise subzones with the subzones in adjacent zones being of varying widths as a fucntion of the position in the furnace;
   each longitudinal zone equipped with means for independently regulating the temperature of the subzones; and
   the pattern of said crosswise subzones being arranged so that the border between subzones are longitudinally out of line with the corresponding borders in adjacent zones so as to eliminate a non-temperature-controlled belt, not contributing to the heating of the glass sheets parallel to the direction of advance of the glass sheets.

8. Device according to claim 7, wherein said means for regulating the temperature of the crosswise subzones comprises means for regulating the total power furnished to each longitudinal zone.

9. Device according to claim 7, wherein said furnace comprises a metal framework, a bottom and a crown insulated by fibrous refractories.

10. Device according to claim 7, wherein the resistors are wound around refractory aluminum silicate tubes.

11. Device according to claim 7, wherein the conveyor for glass sheets comprises a bed of rollers made of hollow tubular elements.

12. Device according to claim 7, wherein said hollow tubular elements are comprised of silica glass.

13. Device according to claim 7, wherein the conveyor is comprised of elements sheathed with a fabric of silica yarn.

14. Device according to claim 7, wherein the power supplied to crosswise subzones located at the corners and center of the furnace is stronger relative to the power supplied to other crosswise subzones.

15. Device for heating glass sheets comprising:
a furnace which comprises an upper layer and a lower layer of resistors placed respectively above and below a conveyor for glass sheets going through the furnace, said resistors of each layer being distributed in longitudinal zones equipped with means for regulating their temperatures.

each longitudinal zone comprising crosswise subzones with the subzones in adjacent zones being of varying widths as a function of the position in the furnace of the longitudinal zone to which they belong;

each longitudinal zone equipped with means for independently regulating the temperature of the subzone;

arranging said crosswise subzones so that the border between subzones are longitudinally out of line with the corresponding borders in adjacent zones so as to eliminate a non-temperature-control belt, not contributing to the heating of the glass sheets parallel to the direction of advance of the glass sheets; and said furnace insulated by a fibrous refractory.

16. Device according to claim 15, wherein said means for regulating the temperature of the crosswise subzones comprises means for regulating the total power furnished to each longitudinal zone.

17. Device according to claim 15, wherein said furnace comprises a metal framework, a bottom and a crown insulated by fibrous refractories.

18. Device according to claim 15, wherein the resistors are wound around refractory aluminum silicate tubes.

19. Device according to claim 15, wherein the conveyor for glass sheets comprises a bed of rollers made of hollow tubular elements.

20. Device according to claim 15, wherein said hollow tubular elements are comprised of silica glass.

21. Device according to claim 15, wherein the conveyor is comprised of elements sheathed with a fabric of silica yarn.

22. Device according to claim 15, wherein the power supplied to crosswise subzones located at the corners and center of the furnace is stronger relative to the power supplied to the other crosswise subzones.

* * * * *